No. 638,009. Patented Nov. 28, 1899.
T. P. GALLUP.
GATE.
(Application filed Jan. 25, 1899.)
(No Model.) 2 Sheets—Sheet 1.
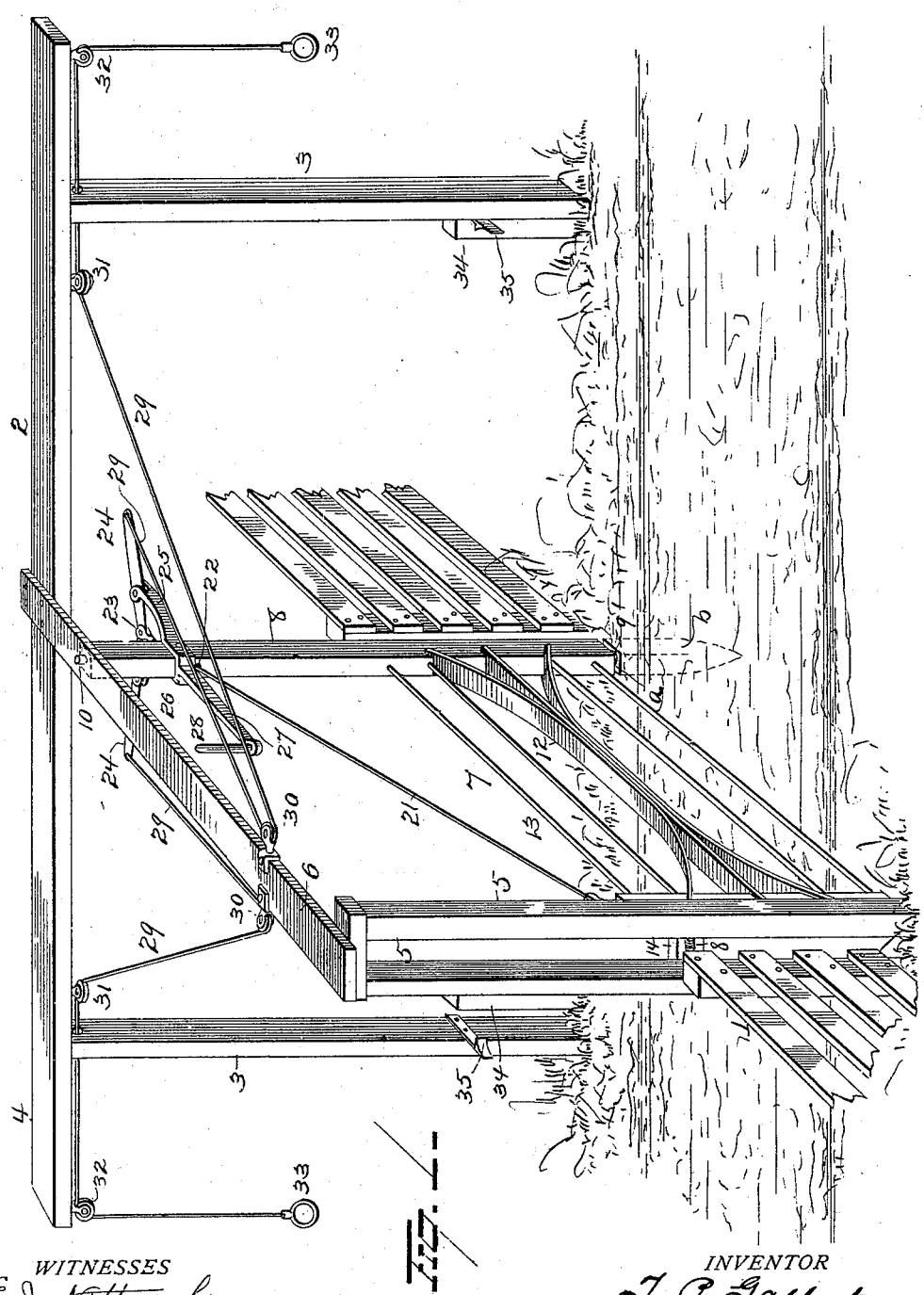
WITNESSES
E. I. Nottingham
G. F. Downing
INVENTOR
T. P. Gallup
By H. A. Seymour
Attorney No. 638,009. Patented Nov. 28, 1899.
T. P. GALLUP.
GATE.
(Application filed Jan. 25, 1899.)
(No Model.) 2 Sheets—Sheet 2.
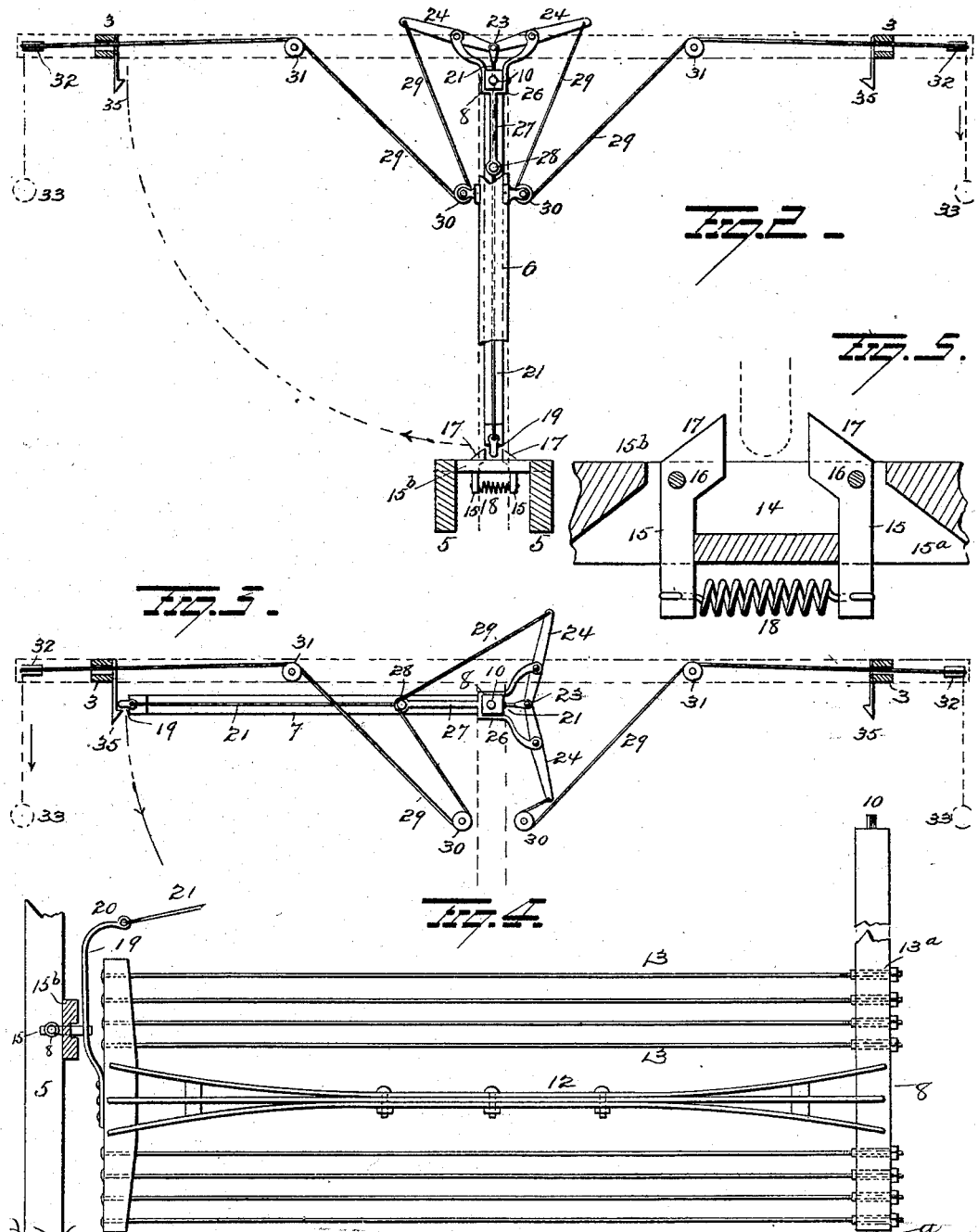
WITNESSES
E. J. Nottingham
G. F. Downing
INVENTOR
T. P. Gallup
By H. A. Seymour
Attorney

UNITED STATES PATENT OFFICE.

THOMAS P. GALLUP, OF BOULDER, COLORADO, ASSIGNOR TO H. S. NILES, OF SAME PLACE, AND EDWARD P. GALLUP, OF DENVER, COLORADO.

GATE.

SPECIFICATION forming part of Letters Patent No. 638,009, dated November 28, 1899.

Application filed January 25, 1899. Serial No. 703,353. (No model.)

*To all whom it may concern:*

Be it known that I, THOMAS PALMER GALLUP, a resident of Boulder, in the county of Boulder and State of Colorado, have invented certain new and useful Improvements in Gates; and I do hereby declare the following to be a full, clear, and exact description of the invention, such as will enable others skilled in the art to which it appertains to make and use the same.

My invention relates to an improvement in gates, and more particularly to that class of farm-gates that may be operated by a person seated in a vehicle, on horseback, or on foot from either side of the gate by means of cords, ropes, or chains disposed in easy reach of the operator, the object being to simplify this class of gates to a great extent and make them easy to operate and strong and durable, as well as neat in appearance.

With this object in view the invention consists in certain novel features of construction and combinations and arrangements of parts, as will be more fully hereinafter described, and pointed out in the claims.

In the accompanying drawings, Figure 1 is a perspective view. Fig. 2 is a plan view showing the gate closed. Fig. 3 is a plan view showing the gate open, and Figs. 4 and 5 are views of details.

1 represents a fence of ordinary construction, and 2 a frame disposed at right angles thereto, comprising uprights 3 3 and a cross-piece 4 connecting said uprights 3 and extending preferably a short distance beyond the same at each end.

5 represents the outer post of the gate-frame and is of approximately the height of the uprights 3 and is connected at its upper end with the cross-piece 4 by means of a top piece 6, disposed at right angles to said cross-piece 4.

7 represents my improved gate, which comprises an inner upright member 8, provided at its lower end with a downwardly-extending pin $a$, which is pivotally mounted in a cup-shaped bearing 9, secured in a post $b$ driven in the ground. The member 8 is provided with a pin or pivot 10 at its upper end, disposed in a hole or bearing in the top piece 6. The outer upright member 11 of the gate is preferably the height of the fence 1 and is connected with the member 8 by means of rails 12 and rods 13, having burs $13^a$ on one or both ends to tighten the same. The rails 12 are preferably disposed a short distance apart at their ends and secured together between their ends, as shown, for the purpose of forming a truss for ornamentation and strength. The ends of the truss-rails are removably inserted in grooves in the uprights of the gate.

The outer post 5 of the gate-frame is provided with a catch 14, which comprises a pair of arms 15, disposed in slots $15^a$ in a block $15^b$, secured to the post 5 or directly in the post 5, as desired, and pivoted between their ends to the block $15^b$, as shown at 16, and enlarged at their inner ends and beveled, as shown at 17. The outer ends of the arms 15, outside the block or post, are connected by a coil or other spring 18, which normally holds the inner ends of the arms a short distance apart. A spring-latch 19 is connected to the outer member 11 of the gate, and when the gate swings into its closed position said latch is adapted to strike the beveled edge of one of said arms 15 and force the same inward, when, the other arm stopping the gate, the arm first struck will be released and spring outward, thus securely holding the latch between the arms 15 and fastening the gate in its closed position. An upwardly-extending spring-arm 20 projects from the latch 19, and a cord or wire 21 is secured to said arm 20. The cord 21 extends upward and rearward, passing through an opening 22 in the inner upright member 8 of the gate, and is secured to a link 23, which connects the inner ends of operating-levers 24. The levers 24 are pivoted between their ends to arms 25, projecting rearwardly from a bracket 26. The bracket 26 is adapted to partially surround the member 8 of the gate and is provided with a forwardly-projecting arm 27, which is parallel with the gate and provided at its free end with an upwardly-projecting pin 28, for a purpose hereinafter explained.

Cords, ropes, or chains 29 are secured to the outer ends of the levers 24 and pass upward and around pulleys 30, attached to the top piece 6, thence to and around pulleys 31, depending from the cross-piece 4, and then parallel with said cross-piece 4, to and around pulleys 32, and thence downward to a point within convenient reach of an operator, where suitable rings or handholds 33 are provided, and said rings or handholds are made of sufficient weight to maintain the cords or ropes 29 always taut.

Suitable stop-posts 34 are provided near the uprights 3 3, and said uprights are provided with spring-catches 35 of any ordinary construction, whereby to secure the latch 19 and maintain the gate in an open position.

The operation of my improved gate is as follows: The operator grasps one of the handholds 33 and pulls the cord, rope, or chain 29, which will effect a movement of one of the levers 24 and move the link 23, which will result in pulling the latch-cord 21 and raising the latch and at the same time throwing the gate open. When the gate reaches its extreme open position, it will strike against the post 34, and the latch 19 will be held securely by the catch 35. It will be seen when the gate is in its open position, as clearly shown in Fig. 3, that the pin 28 on the end of arm 27 will bear against one cord 29 and shorten that cord, and when the operator passes through the gate he gives the other handhold a moderately-sharp pull, and the great leverage gained by the position of the cord around the pin 28 will suffice to shut the gate, the operator not being obliged to wait and pull the cord until the gate closes, as is the case with the gates of this class now in use.

It will be seen that my improved gate can be easily taken apart and packed for shipment, as follows: The rods 13 are unscrewed and withdrawn, and the truss-rails 12, end pieces 11 and 8, and rods 13 can be placed parallel and the gate shipped in a small space. The material forming the frame can be supplied at the place where the gate is to be erected, or it can be shipped in the form of pipes or tubes if lumber should be scarce in that locality.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a fixed frame and a swinging gate having a latch, of a bracket secured to an upright of the gate, said bracket comprising outwardly-projecting arms and an inwardly-projecting arm having an upright member, levers pivoted between their ends to said outwardly-projecting arms, a link pivotally connecting both levers at their inner ends, a connection between said link and the latch, and two cords attached to the outer ends of the respective levers and passing over pulleys on the main frame so as to be both disposed in the path of the upright member of the inwardly-projecting arm of the bracket on the gate, substantially as set forth.

2. The combination with a swinging gate and a latch therefor, of a bracket secured to said gate, arms on said bracket, levers pivoted between their ends to said arms, a link connecting said levers, a cord or wire connecting said latch and link, cords or ropes secured to said levers and passing through pulleys on said frame, an arm on said bracket and a pin on said arm adapted to come in contact with said cords or ropes when the gate is in its open position to facilitate the closing of said gate when the cord is pulled.

In testimony whereof I have signed this specification in the presence of two subscribing witnesses.

T. P. GALLUP.

Witnesses:
  O. H. KRUEGER,
  J. M. SHEARER.